Patented Mar. 10, 1936

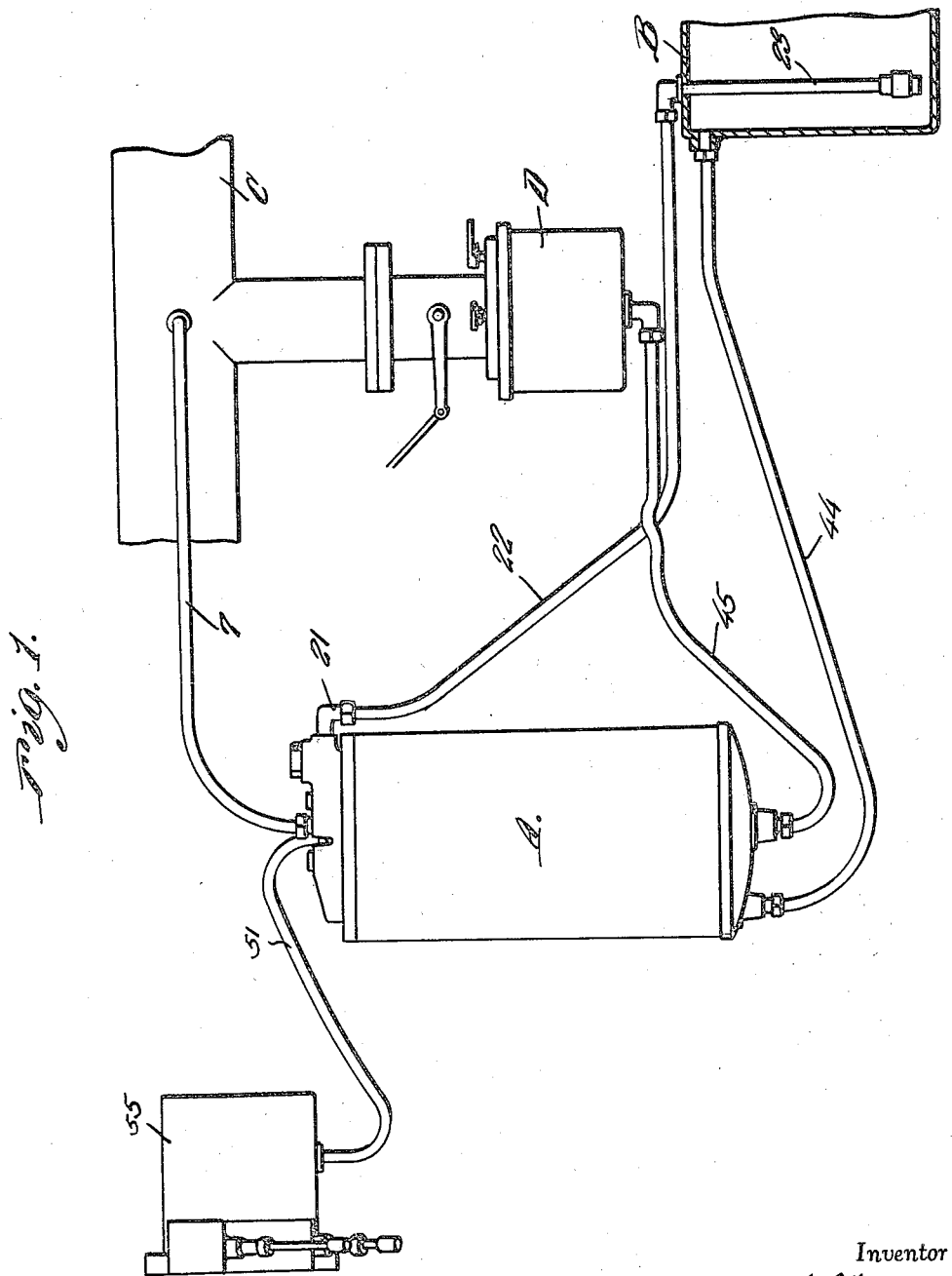

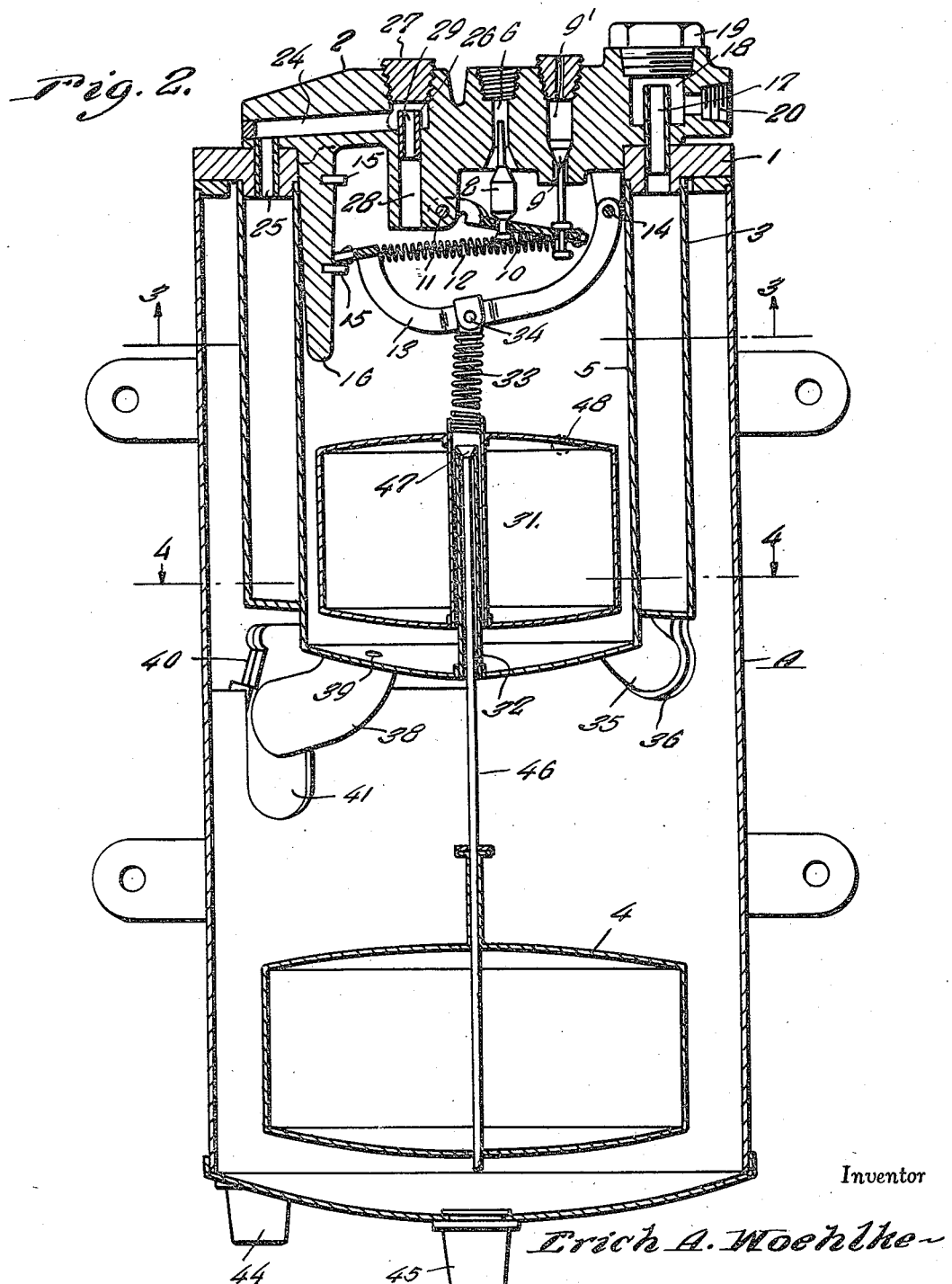

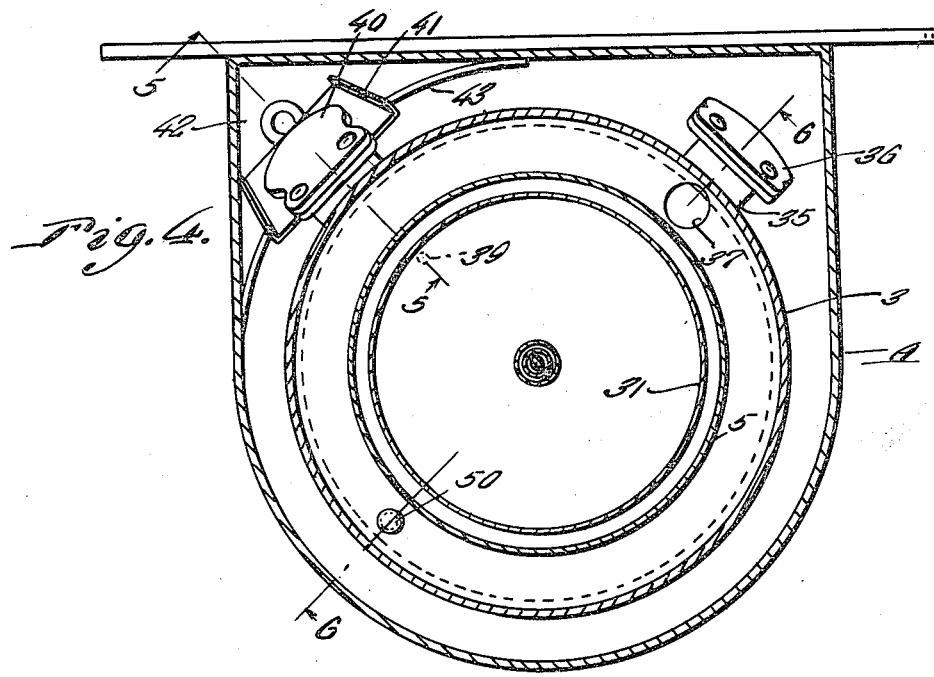
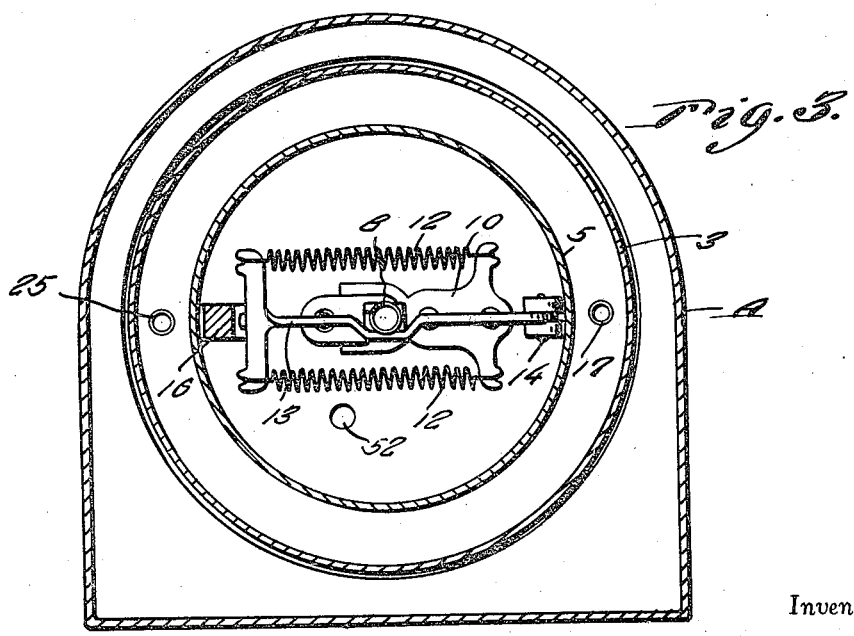

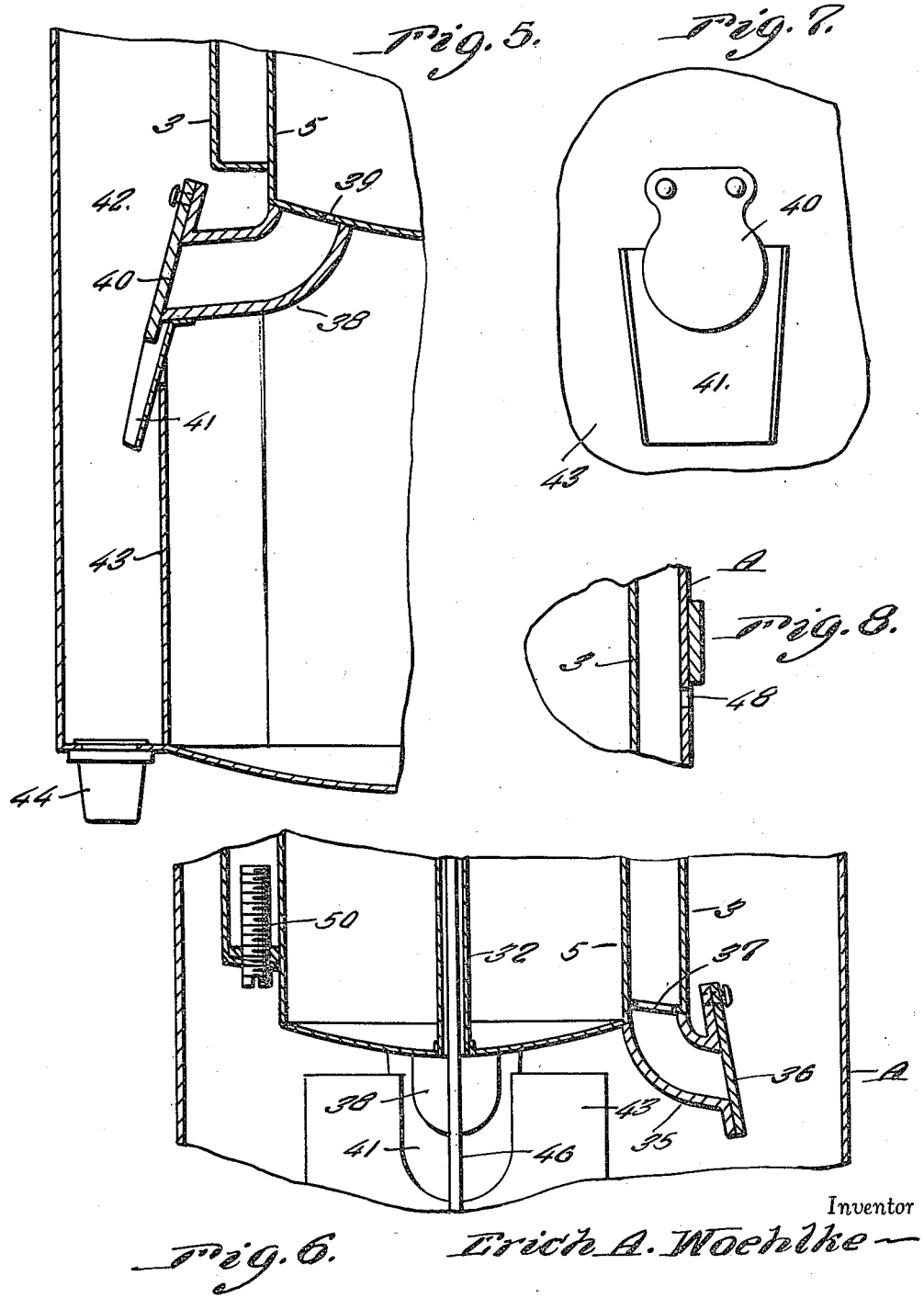

2,033,270

UNITED STATES PATENT OFFICE 2,033,270

FUEL MEASURING AND REGISTERING DEVICE

Erich A. Woehlke, Milwaukee, Wis.

Application December 15, 1933, Serial No. 702,575

5 Claims. (Cl. 73—28)

This invention relates to a device for measuring fuel used in internal combustion engines and the like, the general object of the invention being to provide means located in the vacuum tank and controlled by a float for measuring the fuel.

The device can be used on motor vehicles, aeroplanes and the like.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a diagrammatic view showing how the vacuum tank which contains part of the invention is connected with the intake manifold of an internal combustion engine, the carburetor and the supply tank, and this view also showing the registering mechanism.

Figure 2 is a vertical sectional view through the vacuum tank which is constructed in accordance with this invention.

Figure 3 is a section on line 3—3 of Figure 2.

Figure 4 is a section on line 4—4 of Figure 2.

Figure 5 is a section on line 5—5 of Figure 4.

Figure 6 is a section on line 6—6 of Figure 4.

Figure 7 is a fragmentary elevation showing the valve which controls the discharge of fuel from the upper control tank to the return chamber.

Figure 8 is a detail vertical sectional view showing the vent in a side portion of the vacuum tank.

In these drawings, the vacuum tank is shown at A, the supply tank at B, the inlet manifold of an internal combustion engine at C and the carbureter at D.

The vacuum tank has a cover 1 having an upper part 2 and the upper end of a measuring tank 3 is connected with the cover and has its bottom located a substantial distance from the bottom of the tank A so that this bottom part of the vacuum tank forms a supply chamber in which is arranged the float 4. A small control tank 5 depends from the cover and passes through the tank 3 to a slight distance below the bottom thereof, this tank 5 forming an annular space between itself and the tank 3 and this annular space forms the measuring chamber. A port or passage 6 is formed in the cover part 2 and has its upper end threaded to receive one end of a tube 7 which has its other end in communication with the intake manifold C so that this port or passage 6 forms a vacuum port and is controlled by a valve 8. A vent port 9' is also located in the cover part 2 and is controlled by a valve 9. These valves 8 and 9 are controlled by a plate 10 pivoted to a depending part of the cover 2, as shown at 11, and a spring 12 has one end connected to the free end of the plate 10, while its other end is connected to the free end of a downwardly bowed lever 13 pivoted to a depending part on the cover portion 2, as shown at 14. The free end of the lever 13 operates between the two stops 15 carried by a depending portion 16 of the cover part 2. These parts are so arranged that with the lever 13 in the position shown in Figure 2, the spring 12 will hold the plate 10 in a position with the vent valve 9 closed and the vacuum valve 8 open, but as the lever 13 moves upwardly, it moves the spring to a position where said spring will cause the plate 10 to swing upwardly and thus open the vent valve 9 and close the suction valve 8.

A short tube 17 has one end inserted in a hole in the cover 1 which communicates with the measuring tank 3 and its other end opens into a chamber 18 closed by a plug 19 and a port 20 is in communication with the chamber 18 and is threaded to receive an elbow 21 which is connected by a pipe 22 to a pipe 23 which extends close to the bottom of the supply tank B.

A horizontal passage 24 is formed in the part 2 and has its outer end placed in communication with the tank 3 by the passage 25 and its other end is in communication with a chamber 26 formed in the part 2 and covered by a plug 27 and the lower end of the chamber is in communication with the top part of the tank 5 through means of a passage 28 in the part 2, a short tube 29 being arranged in the chamber 26 and partly extending into the passage 28.

A float 31 is located in the tank 5 and is slidably arranged on a tubular guide 32 attached to the bottom of the tank 5 and a spring 33 has its upper end connected to an intermediate part of the lever 13, as shown at 34, and its lower end is connected with the upper part of the float 31.

A curved discharge pipe 35 depends from the bottom of the measuring tank 3 and has its lower end closed by a flap valve 36, the bottom of the measuring tank having a hole 37 therein in communication with the discharge pipe 35. A curved discharge spout 38 is connected to the bottom of the tank 5 and is in communication with said tank through a small hole 39 and the outer end of this discharge pipe 38 is closed by a flap valve 40 and a spout or deflector 41 directs the fluid flowing through the pipe 38 into a return chamber 42 formed in one corner of the vacuum tank at the lower part thereof by a partition 43. The bottom part of this chamber 42 is connected by a pipe 44 with the supply tank B, as shown in Figure 1.

A pipe 45 connects the bottom of the vacuum tank with the carbureter, as also shown in Figure 1, and the float 4 has a stem 46 attached thereto, the upper part of which passes through the hollow guide stem 32 for the float 31 and has a valve 47 at its upper end for engaging a valve seat formed at the upper end of the hollow guide 32. A vent hole 48 is formed in a side part of the vacuum tank A, as shown in Figure 8, and in dotted lines in Figure 2, this hole being located well above the fuel level in the lower part of the tank A, and is provided to prevent air being trapped in said tank.

With the parts in the position shown in Figure 2, the air vent 9' will be closed by the valve 9 and the suction port 6 will be opened by the valve 8, so that when the engine is operating, the vacuum created in the inlet manifold C will produce a suction in the tube 7 and port 6, so that air will be drawn from the tank 5 and from the tank 3 which is in communication with the tank 5 through means of the passages 24, 25 and 28. The suction in the tank 3 will act to draw liquid from the supply tank B through the pipes 22 and 23, into the chamber 18 and from this chamber the liquid will pass through the tube 17 into the tank 3. This chamber 18 and the tube 17 act as a small sediment chamber which can be cleaned out when the plug 19 is removed. The liquid will fill the space formed by the tanks 3 and 5 and then the liquid will pass through the passages 25, 24 and 28 and drop into the tank 5. The chamber 26 and tube 29 also act as a sediment chamber and can be cleaned by removing the plug 27. The vacuum in the tanks 3 and 5 will hold the valves 36 and 40 closed so that no liquid will discharge through the pipes 35 and 38. When the liquid in the tank 5 reaches a certain level, the upward movement of the float 31 will cause the spring 33 to move the lever 13 upwardly and when said lever reaches a certain point in its upward movement, it will cause the spring 12 to quickly close the suction valve 8 and open the vent valve 9 so that the suction action from the inlet manifold will be closed to the chamber 5 and said chamber or tank 5 will be in communication with the atmosphere through the vent 9'. When this takes place, the valve 36 will open so that the liquid in the tank 3 will discharge into the supply chamber at the bottom of the vacuum tank and this liquid will pass to the carbureter through the pipe 45. The liquid in the tank 5 will slowly discharge through the small hole 39 into the pipe 38, past the valve 40 into the chamber 42 and from this chamber the liquid will pass back into the supply tank through the pipe 44.

The discharge hole 39 for the tank 5 should be of such a size as to allow the measuring tank 3 to empty before the tank 5 is emptied and said hole 39 should be of such a size that just as soon as the measuring tank 3 is empty, the liquid level in tank 5 will be such that the float 31 will pull down the lever 13 so as to open the suction valve 8 and close the vent valve 9 and thus start the filling action of the measuring tank again.

As will be understood, a measured amount of liquid is fed from the tank 3, according to the size of the tank 3, into the lower part or supply chamber of the vacuum tank.

The float 4 in the lower part of the vacuum tank controls the amount of gasoline or liquid which should enter this part of the vacuum tank and as will be seen, this float 4 works in conjunction with the float 31. If the measuring tank 3 has fed a sufficient amount of liquid into the lower part of the vacuum tank to raise the float 4, the stem 46 will hold the float 31 up, which in turn keeps the vacuum valve 8 closed and the vent valve 9 open, thus preventing a vacuum occurring in the upper part of the tank 5 so that no liquid enters the tank 3 from the supply tank. The stem 46 should have an airtight sliding fit in the tubular stem 32 so as to prevent the passage of air from the lower part of the vacuum tank into the tank 5 and the valve 47 helps to prevent this passage of air. The valve stem guide 32 should be of such a height that it will extend above the high level of liquid in the tank 5 and, of course, the surplus chamber 42 must have its upper end located well above the high level of liquid in the lower part of the vacuum tank.

An adjusting screw 50 is threaded in an opening in the bottom part of the tank 3, as shown in Figure 6, for the purpose of getting a micrometer adjustment for the tank 3, to make sure the measure is correct and after this large screw is properly adjusted, it is suitably sealed in position.

Thus it will be seen that a measured amount of liquid is delivered into the lower part of the vacuum tank from the chamber 3 and by making this tank of the proper size, the desired amount of liquid can be delivered into the lower part of the vacuum tank.

As shown in Figure 3, I prefer to use a pair of the springs 12 and these springs are connected at their ends to lateral extensions at the free ends of the plate 10 and the free end of the lever 13, respectively.

A pressure actuated register 55 may be connected by pipe 51 to opening 52 which communicates with the interior of the tank 5. This register will indicate and count the number of fillings of the measuring tank.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. In a fuel feeding system for engines, a measuring tank, means for connecting the same to a source of fuel supply, a valve controlled discharge at the lower end of the measuring tank, the valve of which is closed when suction or vacuum occurs in the measuring tank, a second tank located in the measuring tank, the top of said second tank communicating with the top of the measuring tank, a vacuum connection connecting the measuring tank and said second tank to the inlet manifold of the engine, a valve for controlling the vacuum connection to the measuring tank and said second tank, a valve for venting the two tanks, a float in the second tank, means operated thereby for closing the vacuum valve and opening the vent valve when the float is raised and for closing the vent valve and opening the vacuum valve when the float lowers, and valve controlled means for returning the fuel in the second tank to the supply when the vent valve is opened.

2. In a fuel supply system for a motor including a supply tank, a vacuum tank and a cover for the vacuum tank, a measuring tank supported by the cover and depending therefrom, a control tank supported by the cover and located in but spaced from the measuring tank, a float in the control tank, said cover having a vent port therein in communication with the control tank, a valve for controlling the port, said cover also having a suction port, means for connecting the same with the inlet of the motor, a valve controlling the same, means for placing the upper part of the measuring tank in communication with the upper part of the control tank, means whereby the vacuum created in the two tanks will draw fuel from the supply tank into the measuring tank and some of this fuel will pass into the control tank to raise the float therein, means whereby raising of the float will close the suction port valve and open the vent port valve and lowering of the float will open the suction port valve and close the vent port valve, a valved discharge in the bottom of the measuring tank, said valve being closed when the measuring tank is in communication with the vacuum means, but opening when such means are closed, valve controlled means for leading the fuel in the control tank back to the supply tank, such valve opening when the vacuum port is closed and closing when the port is open.

3. In a fuel supply system for a motor including a supply tank, a vacuum tank and a cover for the vacuum tank, said cover having a vent port therein and a vacuum port, means for connecting the vacuum port with the inlet manifold of the motor, a measuring tank connected with the cover and depending therefrom, a control tank depending from the cover and passing through the measuring tank and spaced therefrom to form a measuring chamber, means for connecting the upper end of the measuring chamber to the supply tank, a valve for controlling the vacuum port, a vent valve controlling the vent port, said cover having a passage connecting the top of the measuring tank with the top of the control tank, a float in the control tank, means operated by upward movement of the same for closing the vacuum port valve and opening the vent valve, said vent valve being closed and the vacuum port valve opened by downward movement of the float, a discharge spout connected to the lower end of the measuring tank and discharging into the lower part of the vacuum tank, a flap valve closing the same, a chamber forming member in the vacuum tank, a discharge pipe discharging into the same and the bottom of the control tank having a small hole therein discharging into the last mentioned discharge pipe, a flap valve closing the discharge end of said discharge pipe, a pipe connecting the said chamber forming member with the supply tank, a float in the lower part of the vacuum tank, a stem connected therewith and extending in an air-tight but slidable manner into the control tank and acting to hold the first float in raised position when the second float is in raised position.

4. In a fuel supply system for a motor including a supply tank, a measuring tank, a control tank having its upper end in communication with the upper end of the measuring tank, means for placing the upper end of the control tank in communication with a suction producing part of the motor, a valve for controlling such communication, means including a valve for connecting the upper end of the control tank with the atmosphere, a float in the control tank, means operated thereby for closing the first mentioned valve and opening the vent valve when the float is in raised position and closing the vent valve and opening the first mentioned valve when the float is in lowered position, a receptacle into which the measuring tank discharges, a valve for controlling such discharge and closed when vacuum occurs in the measuring tank, and means including a valve for returning the fuel in the control tank to the supply, said valve closing when a vacuum occurs in the control tank.

5. In a fuel supply system for a motor including a supply tank, a measuring tank, a control tank having its upper end in communication with the upper end of the measuring tank, means for placing the upper end of the control tank in communication with a suction producing part of the motor, a valve for controlling such communication, means including a valve for connecting the upper end of the control tank with the atmosphere, a float in the control tank, means operated thereby for closing the first mentioned valve and opening the vent valve when the float is in raised position and closing the vent valve and opening the first mentioned valve when the float is in lowered position, a receptacle into which the measuring tank discharges, a valve for controlling such discharge and closed when vacuum occurs in the measuring tank, and means including a valve for returning the fuel in the control tank to the supply, said valve closing when a vacuum occurs in the control tank, a float in the receptacle and means operated thereby for holding the first float in raised position while the second float is in raised position.

ERICH A. WOEHLKE.